United States Patent [19]
von Kaler et al.

[11] Patent Number: 5,177,967
[45] Date of Patent: Jan. 12, 1993

[54] HYDROSTATIC TRANSAXLE

[75] Inventors: Roland L. von Kaler, Tecumseh; Dale I. Havens, Addison; Michael P. Weirich, Clinton, all of Mich.

[73] Assignee: Tecumseh Products Company, Tecumseh, Mich.

[21] Appl. No.: 733,450

[22] Filed: Jul. 22, 1991

[51] Int. Cl.⁵ ............................... F16D 39/00
[52] U.S. Cl. ........................ 60/487; 91/492; 91/493
[58] Field of Search .............. 60/488, 489, 487; 91/491, 492, 493

[56] References Cited

U.S. PATENT DOCUMENTS

| | | | |
|---|---|---|---|
| 3,165,068 | 1/1965 | Burnham et al. | 91/492 |
| 3,376,703 | 4/1968 | Buczynski | 60/53 |
| 3,584,460 | 6/1971 | Boyd | 60/53 |
| 3,895,565 | 7/1975 | Schottler | 91/492 |
| 3,968,734 | 7/1976 | Rutz | 91/491 |
| 4,126,994 | 11/1978 | Rockwell | 60/420 |
| 4,845,951 | 7/1989 | Hayashi et al. | 60/488 |
| 4,920,859 | 5/1990 | Smart et al. | 91/497 |
| 4,979,583 | 12/1990 | Thoma et al. | 180/62 |

FOREIGN PATENT DOCUMENTS 2638575  3/1977  Fed. Rep. of Germany ........ 91/491

*Primary Examiner*—John T. Kwon
*Assistant Examiner*—F. Daniel Lopez
*Attorney, Agent, or Firm*—Baker & Daniels

[57] ABSTRACT

A hydrostatic transaxle includes a hydrostatic transmission with a pump and motor, the pump and motor each including a track ring radially surrounding a cylinder in which are disposed a plurality of pistons rotatable on a fixed conduit. The motor track ring includes radially extending lugs disposed 180° from each other that are captured between the upper and lower transaxle casing halves thereby preventing axial or radial movement of the motor track ring.

14 Claims, 6 Drawing Sheets

HYDROSTATIC TRANSAXLE

BACKGROUND OF THE INVENTION

1. Field of the Invention

The present invention generally relates to hydrostatic transmissions and transaxles and, more particularly, is concerned with securing the motor track ring within the hydrostatic transaxle.

2. Description of the Prior Art

Hydrostatic transmissions transmit rotary mechanical motion, typically from an internal combustion engine, to fluid motion, typically oil, then back to rotary mechanical motion to rotate a drive axle in order to drive a vehicle such as a lawn and garden tractor. The hydrostatic transmission regulates or controls the output rotary mechanical motion such that varying output speeds in the forward and reverse directions are possible with a single speed input rotary mechanical motion. Within a hydrostatic transmission of the radial piston type, a cylinder unit having a pump and motor rotates on a fixed pintle with pistons positioned within the cylinders and attached to slippers mounted in an expander band so that as the cylinder unit rotates, the pistons drive or are driven by the slippers which engage the surrounding eccentric annular track ring of the pump and motor. The pistons of the pump create a pressurized fluid flow that drives the motor pistons which rotate an output shaft. The transmission ratio is therefore directly proportional to the eccentricity of the track ring of the pump relative to the fixed pintle and the motor track ring. This type of hydrostatic transmission is shown in U.S. Pat. No. 4,979,583 entitled Variable Speed Transaxle, issued Dec. 25, 1990, and pending application Ser. No. 07/535,462 entitled Variable Speed Transaxle filed Jun. 8, 1990 both of which are specifically incorporated by reference herein.

The motor track ring, however, does not need to change its eccentricity and is therefore fixed within the transmission. Prior art methods of fixing the motor track ring within the transmission casing have included seating the motor track ring by extending the pivot pin of the pump track ring through the motor track ring. This however requires additional parts to connect the pivot pin to the motor track ring and also enlarges the inboard side of the hydrostatic portion of the unit. This is disadvantageous in that enlarging the inboard side of the hydrostatic portion necessitates that the output gearing from the hydrostatic unit be moved axially further out, thereby lengthening the overall dimension of the transaxle. In addition, this requires that the differential be axially shifted in the same direction, thus shortening one of the axles. In shortening one of the axles, that axle is less able to withstand transverse loading. It is thus advantageous for both axles to be as long as possible in order to provide a better bearing support.

SUMMARY OF THE INVENTION

The present invention provides in a hydrostatic transmission a motor track ring capturing arrangement wherein the track ring is clamped between the two halves of the transmission casing to thereby hold the track ring stationary relative to the fixed pintle and casing.

The aforementioned problems are thus solved by the present invention in that a separate part, such as a pin, is not necessary to hold the motor track ring, thereby allowing more space for the internal output gearing.

In one form of the invention, the track ring for the motor includes an opposed pair of extending lug portions which are seated in corresponding recesses cast in the lower transmission casing. The upper transmission casing thus clamps or bolts over the lower transmission casing fixing the track ring relative to the fixed pintle.

It is therefore an advantage to the present invention that the elimination of the pins eliminates the need to anchor the pin in the casing and this space can then be used to support the output shaft on which two spur gears are mounted.

In addition, the present invention is advantageous in that the smaller spur gear is located inboard of the gearing while the ring gear for the differential can be located closer to the center of the transmission, which has the overall effect of lengthening the right hand axle providing better loading and bearing support.

The invention, in one form thereof, comprises a hydrostatic transmission having a housing including an upper half and a lower half with input drive means for transmitting rotational energy to said transmission, a conduit disposed within the housing and connecting the pump and motor, a pump in the housing driven by the input drive means, a pump track ring radially outwardly disposed of the pump pistons, the pump track ring being eccentrically pivotable about said conduit, a motor in the housing radially disposed on the conduit and in fluid communication therewith, a motor track ring radially outwardly disposed of the motor pistons, said motor track ring being clampingly held between said upper and lower housings to retain said motor track ring fixed relative to said conduit, and output drive means connected to the motor for outputting rotational energy therefrom.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
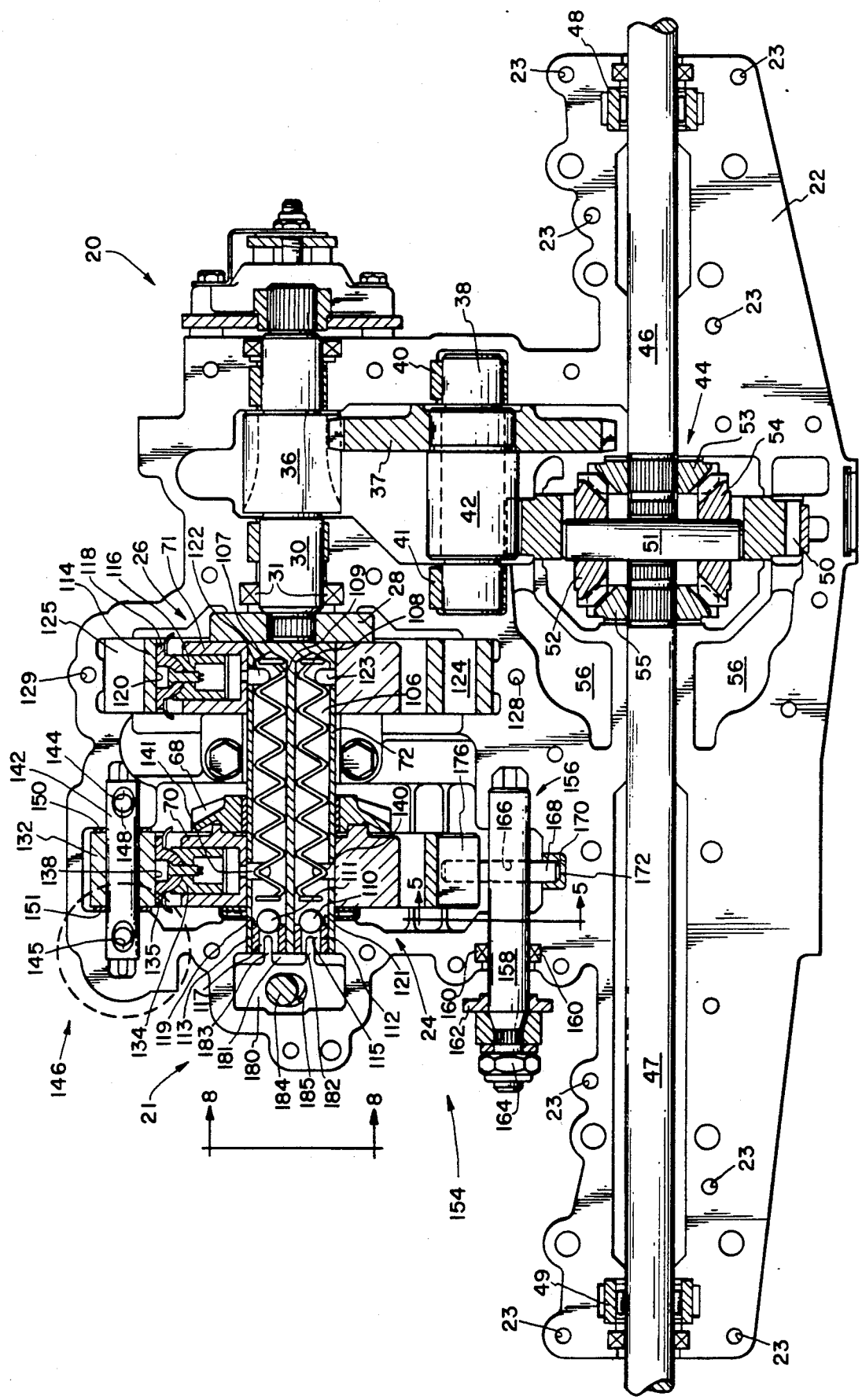
FIG. 1 is a horizontal sectional view showing a variable transaxle in accordance with the a preferred embodiment of the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Figure 16:
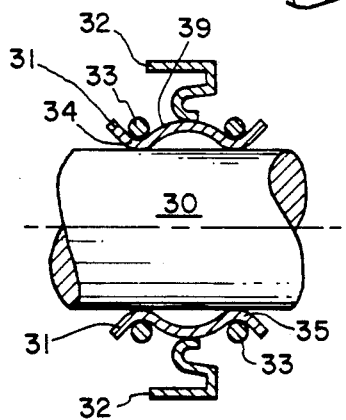
FIG. 16 is an enlarged fragmentary view of the oil seal.
Figure 14:
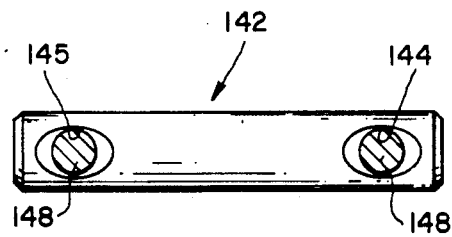
FIG. 14 is an elevational view of the pump track ring pivot pin.

Referring now to the drawings, and particularly to FIG. 1, there is shown a variable speed transaxle or hydrostatic transaxle (HST) 20 in accordance with the principles of the present invention. HST 20 includes a hydraulic or hydrostatic unit 21 housed in a lower transaxle casing 22 having bolt holes 23, the hydrostatic unit 21 including a pump 24 and motor 26, being described in detail hereinbelow, for transferring rotary motion from an energy source such as an internal combustion engine (not shown) to the drive wheels of a vehicle (not shown) in which the HST 20 is installed. The drive wheels (not shown) are drivingly connected to the hydrostatic unit 21 through a succession of gearing beginning with an output member 28 axially connected to motor 26 so as to rotate therewith. Output member 28 is drivingly connected to an output shaft 30 seated in the transaxle casing of which only lower transaxle casing 22 is shown in FIG. 1 while pinion gear 36 is disposed on output shaft 30 which meshes with a output gear 37 disposed on a transfer shaft 38 supported by bearings 40 and 41. Disposed on transfer shaft 38 is a transfer gear 42 imparting its rotational energy to differential 44 for driving right and left axle shafts 46 and 47 each respectively supported in lower transaxle casing 22 by right and left axle bearings 48 and 49. Differential 44 includes a ring gear 50 meshed with transfer gear 42, a transverse shaft 51 and bevel gears 52, 53, 54, and 55, which are drivingly connected to right axle shaft 46 and left axle shaft 47. Surrounding differential 44 and the gearing is an oil chamber 56, which is separate from the chamber for the hydrostatic unit 21, and serves as a reservoir of oil to lubricate the differential 44. Thus, as the motor 26 rotates, the motion is transferred to the axle shafts 46 and 47 to turn the wheels (not shown) attached thereto in order to drive the vehicle. Since the oil chamber 56 is separate from the hydrostatic unit 21, it is necessary to ensure that the oil from oil chamber 56 does not mix with the oil in the hydrostatic unit 21 to avoid contamination of this hydrostatic oil. Thus, there is radially provided on output shaft 30 a double-lipped oil seal 31 located adjacent output member 28. Referring to FIG. 16, the double-lipped oil seal 31 is essentially W-shaped having two lips 34 and 35 which are urged into contact with the surface of output shaft 30 by annular spring clip 32 and annular retainers 33. The retainers 33 hold lips 34 and 35 against shaft 30 while spring clip 32 urges the bowed center portion 39 inwardly. The double-lipped construction of oil seal 31 thus prevents the flow of oil from the differential side of the transaxle to the hydrostatic unit side, and vice versa.

Figure 2:
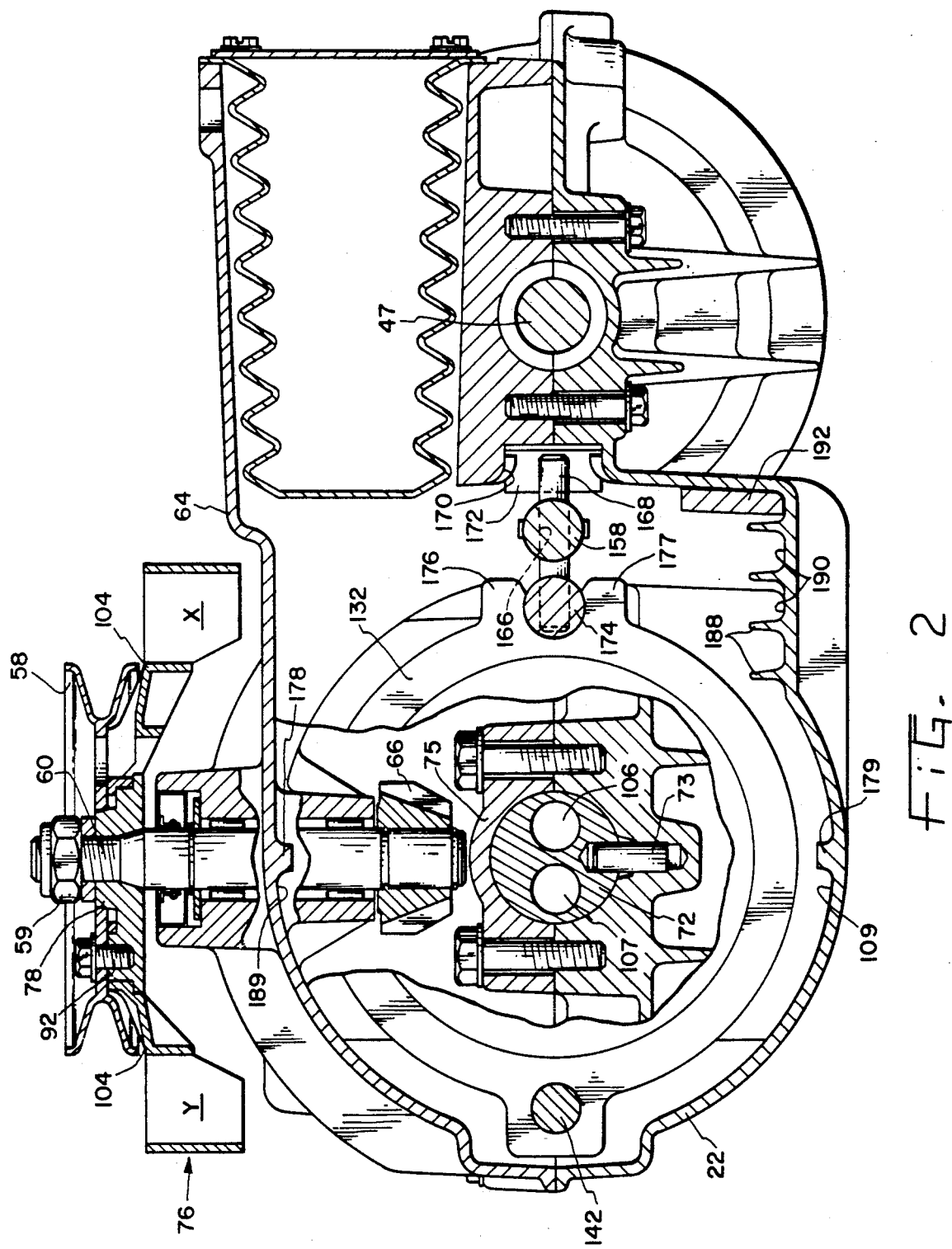
FIG. 2 is a partially cut away end view of the variable speed transaxle.
Figure 9:
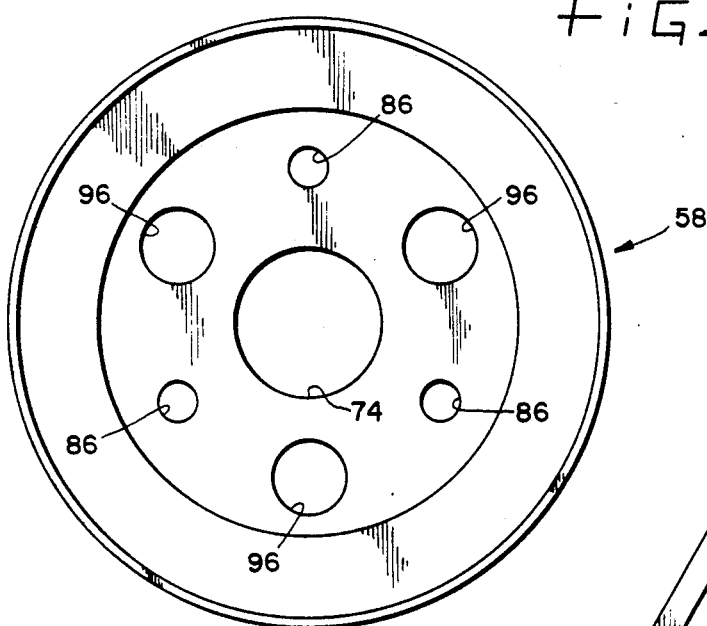
FIG. 9 is a plan view of the pulley.
Figure 10:
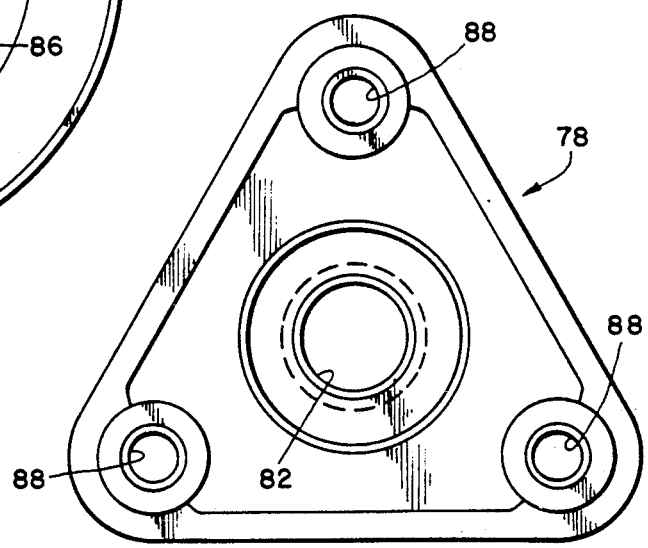
FIG. 10 is a plan view of the input drive coupling.
Figure 13:
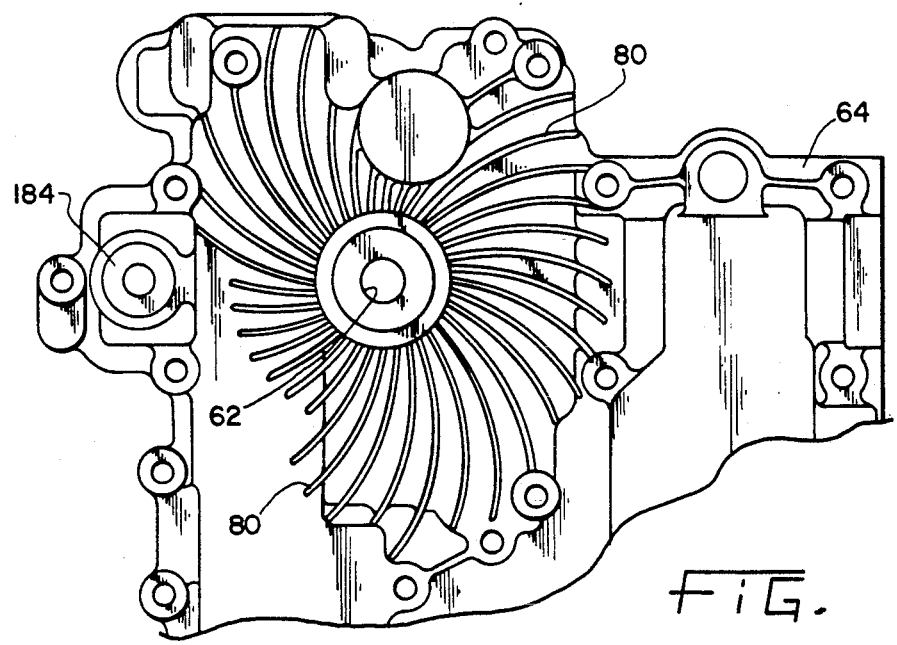
FIG. 13 is a fragmentary plan view of the upper transaxle housing over the input drive portion depicting the cast-in cooling vanes.

The hydrostatic unit 21, as mentioned above, is driven by an external energy source such as an internal combustion engine (not shown) and, referring to FIG. 2, is generally connected to the hydrostatic transmission 20 via a belt (not shown) from an output shaft of the internal combustion engine to a pulley 58. The pulley 58, depicted in FIG. 9, has an input drive shaft bore 74 that allows input drive shaft 60 to extend therethrough and is drivingly connected thereto by a nut 59 threaded onto the input drive shaft 60 which also extends through a bore 62 in the upper transaxle casing 64 (see FIG. 13) and terminates with a bevel gear 66 that meshes with a pump input bevel gear 68 mounted to a cylinder 70 being rotatably mounted on pintle 72 being fixed within the hydrostatic unit 21 by pin 73 and saddle clamp 75 (see FIG. 2). Thus, the rotation of input drive shaft 60 is imparted to the pump 24 to cause rotation thereof in order to drive motor 26 and the axles 46 and 47 as described above.

Referring to FIGS. 2 and 9-13, pulley 58 (FIG. 9) forms part of an external transaxle cooling system which, in cooperation with a fan 76 (FIGS. 11 and 12), a drive coupling 78 (FIG. 10), and external helical fins 80 (see FIG. 13) on the upper transaxle casing 64, all of which are described in detail hereinbelow, provides a continuous, helical air flow pattern that smoothly and unimpededly flows over the hydrostatic transmission 20 effecting cooling thereof with minimal air turbulence, since the fins 80 being curved in the same direction as the air flow pattern produced by the fan 76 act in mutual cooperation.

As best seen in FIG. 2, axially downwardly of pulley 58 is the drive coupling 78 likewise disposed or splined on input drive shaft 60 extending through an input drive shaft bore 82 of the drive coupling 78, and axially downwardly of drive coupling 78 is the fan 76 also which is disposed on input drive shaft 60 extending through an input drive shaft bore 84 of the fan 76. Thus the drive coupling 78 is connected to the input drive shaft 60 so as to be rotatably one therewith. Pulley 58, FIG. 9, drive coupling 78, FIG. 10, and fan 76, FIGS. 11 and 12, each respectively include bolt apertures 86, 88, and 90 in which are received coupling bolts 92 (of which only one is shown in FIG. 2) that hold pulley 58, drive coupling 78 and fan 76 together while disposed on the input drive shaft 60. Bolt apertures 88 are located at the apexes of the equilateral triangular shaped drive coupling 78 while bolt apertures 86, and 90 each form the apexes of an equilateral triangle that correspond in shape to that of drive coupling 78. The drive coupling 78 is triangular shaped to correspond with a triangular shaped hub portion 94 in the center of fan 76 forming a semi-locking driving fit between the drive coupling 78 and fan 76. In addition, the triangular shape of drive coupling 78 allows for the communication of air apertures 96 and 98 respectively located in pulley 58 and fan 76 on the sides of the triangle formed by respective bolt apertures 86 and 90. Thus when the pulley 58, drive coupling 78, and fan 76 are bolted together the air apertures 96 of the pulley 58 and air apertures 98 of the fan 76 are axially aligned (FIG. 2).

Figure 11:
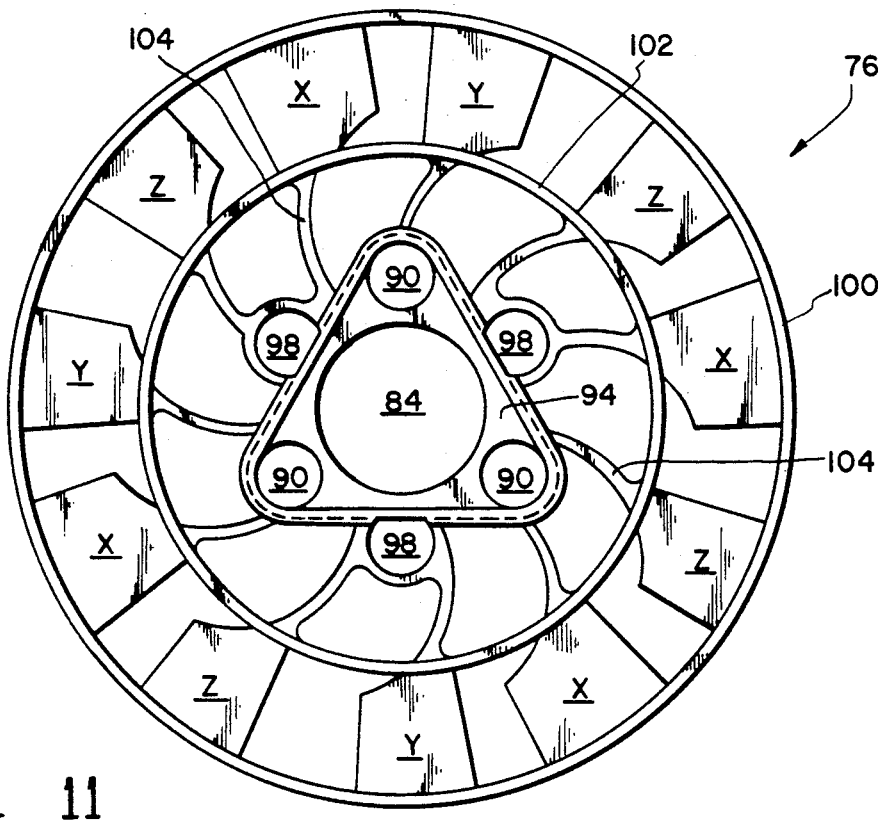
FIG. 11 is a bottom view of the fan.
Figure 12:
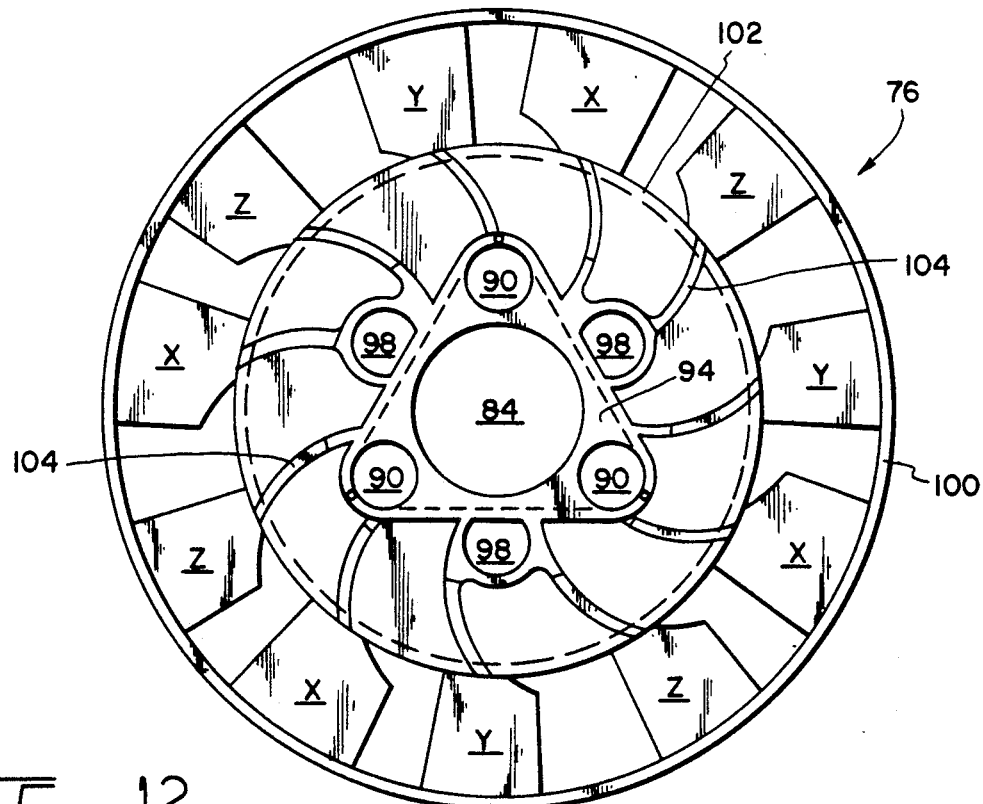
FIG. 12 is a top view of the fan.

The fan 76, referring to FIGS. 11 and 12, has three different shapes of outer fan blades X, Y, and Z, which axially extend from the top to the bottom of the fan 76 such that rotation of the fan 76 on input drive shaft 60 causes air to be drawn downwardly towards the hydrostatic transaxle 20, then outwardly. Blades X, Y, and Z also radially extend from the outer periphery 100 to an inner radius 102 for an extension distance that is approximately $\frac{1}{3}$ of the total radius of the fan 76. Extending from the inner radius 102 to the triangular shaped hub portion 94 are fan ribs 104 that also axially extend from the top to the bottom of the fan 76 and act to direct the inflowing air downwardly toward external fins 80.

In operation, three elements, namely the air apertures 96 and 98, the blades X, Y, and Z, and the fan ribs 104 cooperatively serve to draw air into the fan 76 and create a helical air flow pattern which spreads downwardly and outwardly over the external fins 80 formed in the transaxle upper casing 64, while the radial shape of the external fins 80 correspond to the rotational direction of the helical air flow pattern to permit smooth and efficient cooling of the hydrostatic transaxle 20 by allowing the air to flow without impediment or created air turbulence that would retard or hinder the constant flow pattern created by the fan 76.

Now, referring again to FIG. 1, the hydraulic unit 21 of the hydrostatic transaxle 20, includes a pump 24, driven by the input system described above, which in turn drives the motor 26, both the pump and motor 26 being mounted on a fixed conduit in the form of pintle 72. The pintle 72 comprises two passageways or conduits 106 and 107 each having a spring 108 and 109 disposed therein which retain ball valves 110 and 111 adjacent seats 119 and 121 of plugs 112 and 113 threaded into one end of the pintle, each defining discharge ports 115 and 117. Thus, ball valves 110 and 111 normally close discharge ports 115 and 117 during operating conditions due to the pressure exerted within pintle 72, except when make-up oil is needed, and this maintains a closed pressure system between the pump 24, the motor 26, and pintle 72. Radially outwardly surrounding pintle 72 is pump 24 (in FIG. 1 being on the left side) and motor 26 (in FIG. 1 being on the right side). The specific principles of operation of a hydrostatic unit 21 of the type as described hereinabove and below, will not be explained as the principles are known in the art and do not form a part of this invention. In general, however, a cylinder such as pump cylinder 70, being applicable to both the pump 24 and motor 26 of the hydrostatic unit 21, is rotatable on pintle 72 and has a plurality of bores (not shown) in which are disposed a plurality of pistons (e.g. pump piston 134 and motor piston 116) that axially reciprocate within the bores and radially rotate with respect to the pintle 72. The cylinders thus rotate around pintle 72 and within their respective track ring, described hereinbelow, while the respective pistons pump fluid through rotating action of the cylinder as in the case of pump 24, or are pumped by fluid pressure flowing through pintle passageways 106 and 107 of pintle 72 as in the case of motor 26. The pump 24 and motor 26 form a closed fluid path being in communication with each other via the pintle 72 and its pintle passageways 106 and 107, the fluid flowing from the action of the rotating pistons 134 of the pump 24 into the pistons 116 of the motor 26 causing the motor to rotate output member 28 being attached to the motor cylinder 71.

Motor 26 comprises a motor track ring 114 radially surrounding a plurality of pistons 116 having corresponding slippers 118, of which only one of each is shown, the slippers 118 radially adjacent to the inner radius 120 of motor track ring 114. The pistons 116 with their slippers 118 are rotatable around pintle 72 within the motor track ring 114 and are in fluid communication with the pintle tubes 106 and 107 via motor pintle ports 122 and 123. The motor track ring 114, however, is fixed eccentrically relative to the pintle 72 so that the pistons 116 reciprocate radially and rotate.

Figure 3:
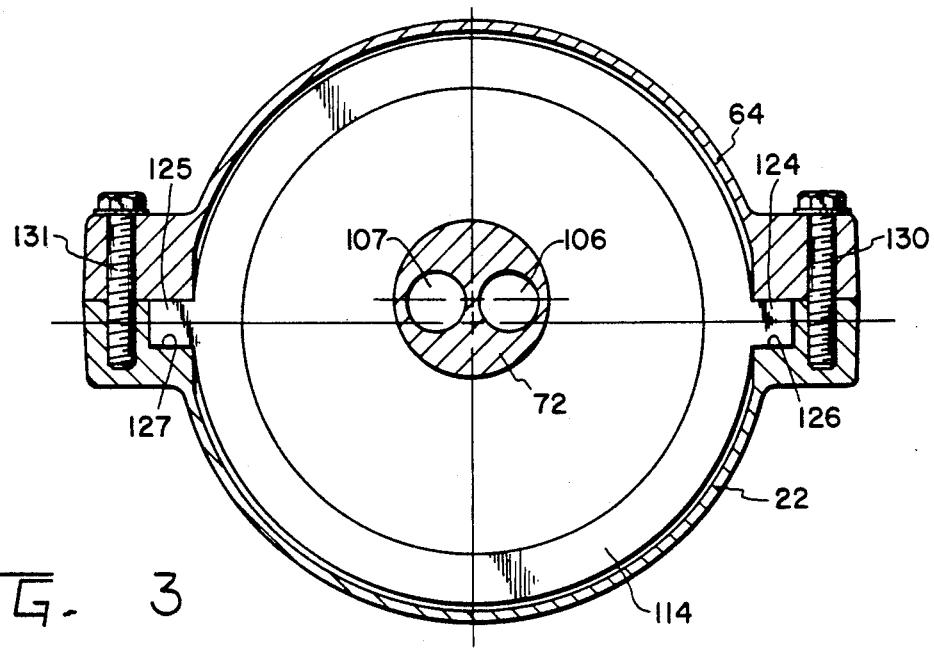
FIG. 3 is a sectional view of the track ring capturing arrangement in accordance with a preferred embodiment of the present invention.

Referring to FIG. 3, the present invention will be described. The motor track ring 114 includes radially extending lug portions 124 and 125 which fit into recesses 126 and 127 cast into the lower transaxle casing 22. The upper transaxle casing 64 being attached to the lower transaxle casing 22, includes, radially adjacent the lug portions 124 and 125, bolt apertures 128 and 129 through which bolts 128 and 129 extend to thereby clampingly fix the motor track ring 114 between the upper and lower transaxle housings 64 and 22. The elimination of a pin or rod extending through the transaxle 20 to retain or fix the motor track ring 114 shortens the overall axial length of the transaxle and permits drive train gearing to be closer to the motor 26.

Alternatively, recesses could be formed in both housing halves 22 and 64, or in only the upper half 64. Other techniques could be used to clamp track ring 114 other than lugs 124 and 125.

As stated above, pump 24 radially surrounds pintle 72 and comprises a pump track ring 132 surrounding a plurality of pistons 134 having corresponding slippers 136, of which only one of each is shown. The slippers 135 are radially adjacent to the inner radius 138 of pump track ring 132. The pistons 134 with their slippers 135 are rotatable around pintle 72 within the pump track ring 132 and are in fluid communication with the pintle tubes 106 and 107 via pump pintle ports 140 and 141. Pump track ring 132, however, is not fixed relative to pintle 72 as is motor track ring 114 although pump 24 is eccentric relative to pintle 72 as is motor 26. In order to create a variable output in both the forward and reverse directions from motor 26 and thus the axles 46 and 47, the pump track ring 132 eccentrically pivots around the pintle 72 which causes more or less fluid to be pumped from pistons 134 into pintle ports 140 and 141 through pintle tubes 106 and 107 out through motor pintle ports 122 and 123 driving motor pistons 116 depending on the degree and relative direction of eccentricity of the pump track ring 132 to the pintle 72.

Figure 4:
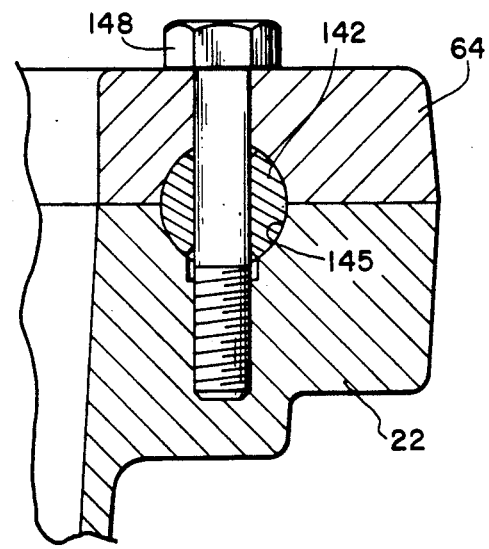
FIG. 4 is an enlarged fragmentary view of the pivot pin bolt taken along line 4—4 of FIG. 15.
Figure 7:
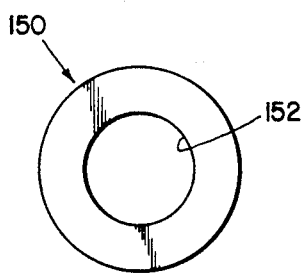
FIG. 7 is a plan view of the ring guide.
Figure 15:
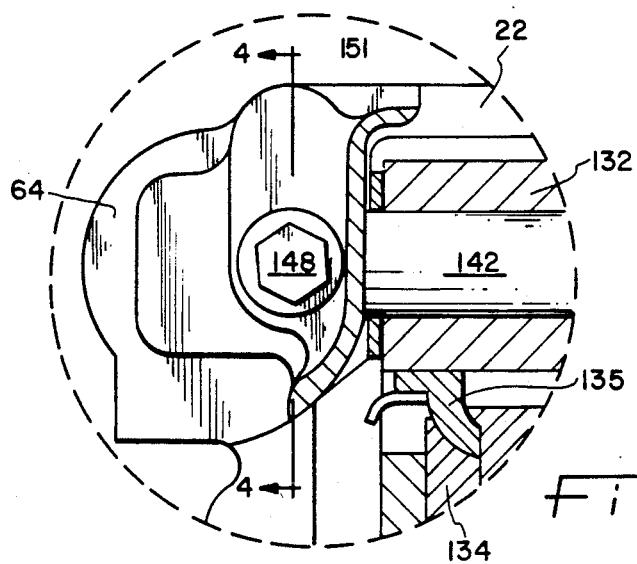
FIG. 15 is an enlarged fragmentary view of the dashed circular portion of FIG. 1 showing the connection of the pivot pin.

Referring to FIGS. 1, 4, and 14-15, a pivot pin 142 having radial clearance bores 144 and 145 on both ends thereof is located on the outboard side 146 of the hydrostatic transaxle 20 relative to axle 46 and 47 and extends through the pump track ring 132 so that the pump track ring 132 may pivot about pivot pin 142. Since pivot pin 142 is subjected to a large amount of stress due to large hydrostatic pressures within pump 24, pivot pin 142 must be rigidly held in place. Two hydrostatic casing bolts 148 extend through the casing and through bores 144 and 145. Thus, as shown in FIGS. 15 and 4, pivot pin 142 is secured between the upper and lower casing halves 64 and 22 not only by the normal clamping force existing between the casing halves but also by the casing bolts extending through the pivot pin 142 itself exerting high localized clamping force. In order to promote smooth pivoting of the pump track ring 132, pivot pin guides 150 and 151 having pivot pin guide bores 152 (see FIG. 7) are disposed on pivot pin 142 on both sides of pump track ring 132 adjacent pump track ring 132 and the upper and lower casings 64 and 22. The pivot pin guides are preferably made of a resilient plastic material such as Hytrel ® or nylon since this would prevent rattling and promote smooth pivoting.

Figure 5:
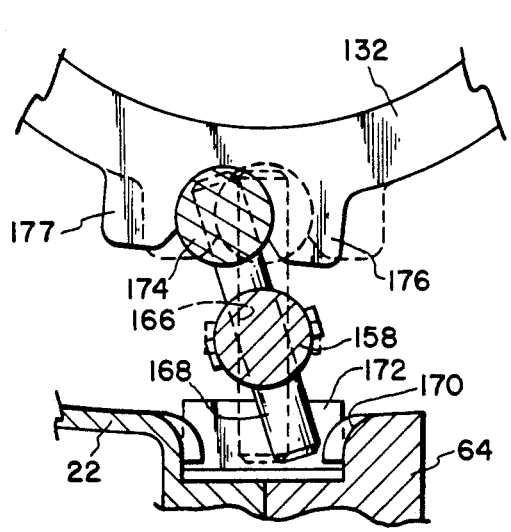
FIG. 5 is an enlarged fragmentary sectional view of the control guide assembly.
Figure 6:
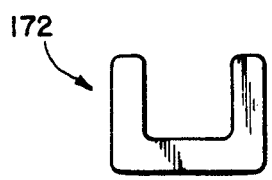
FIG. 6 is an end view of the control guide.
Figure 6A:
FIG. 6A is an elevational view of the control guide.

Referring now to FIGS. 1, 2, and 5, pump track ring 132, being pivotable around pivot pin 142 so as to be eccentrically pivotable about pintle 72, and controlled by an operator through a control mechanism 156 is located on the inboard side 154 of the hydrostatic unit 21. The control mechanism 156 consists of a control rod 158 extending into the transaxle and which rotates therein through action of a control lever 162 attached to the control rod 158 via nut 164 threaded on the end of control rod 158 projecting beyond the transaxle. The control rod 158 has a radial bore 166 in which is disposed a control pin 168 that pivots in the direction of rotation of control rod 158, being attached thereto. The control pin 168 radially extends beyond the control rod 158 in one direction into a recess 170 formed in the upper and lower casings 64 and 22 in which is disposed a control guide 172. The control guide 172, FIGS. 6 and 6A, is a longitudinally elongated U-shaped member, preferably made of a plastic material such as Hytrel ® or nylon, and serves to eliminate noise and rattling as the control pin 168 pivots within the recess 170 when the control unit 156 is actuated. The control pin 168 also radially extends in the other direction and is captured in a recess of rod 174 disposed between pump track ring ears 176 and 177 so as to pivot pump track ring 132 around pivot pin 142 and eccentrically around pintle 72. Thus as control lever 162 is moved by the operator, the stationary control rod 158 is rotated within the transaxle (FIG. 5), the dotted lines showing the movement of the control unit 158 and pump track ring 132. This pivots pump track ring 132 around pintle 72, and depending on the direction and relative degree of movement of the pump track ring 132, drives the motor 26 faster or slower in a forward or reverse direction according to the general principles of hydrostatic transmissions.

As pump track ring 132 is rotated, stops 178 and 179 radially disposed 180° from each other and 90° in both radial directions from the control unit 156, respectively cast in the upper and lower casings 64 and 22 (FIG. 2) provide a positive stop to prevent overtravel of the pump track ring 132. As pump track ring 132 upwardly pivots towards upper inner surface 189, the pump track ring contacts projection 178, and as pump track ring downwardly pivots towards lower inner surface 191, the pump track ring contacts projection 179. Thus on upward or downward travel, pump track ring 132 contacts the respective projection.

Figure 8:
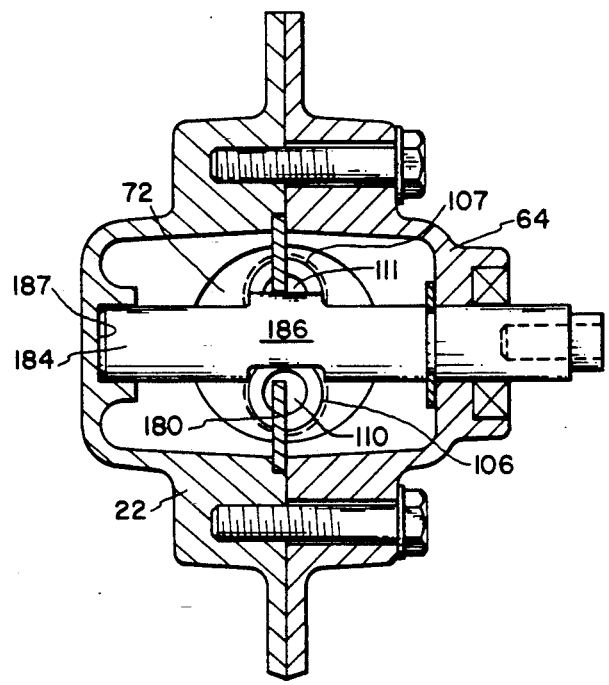
FIG. 8 is an enlarged sectional view of the dump valve assembly taken along line 8—8 of FIG. 1.

Referring to FIGS. 1 and 8, there is shown a flat one-piece dump valve plate 180 fabricated from stamped metal or alternatively made of a plastic material, having a bore 185 and plate fingers 182 and 183. Dump valve plate 180 with fingers 182 and 183 is disposed at the end of pintle tubes 106 and 107 where ball valves 110 and 111 are located within clearance slot 181 formed between the upper and lower casings 64 and 22. The plate fingers 182 and 183 respectively extend through discharge ports 115 and 117 to urge respective ball valves 110 and 111 off their seats 119 and 121 thereby causing communication of pintle passageways 106 and 107 with the interior chamber of the hydrostatic transaxle 20. A cam rod 184 having offset portion 186 extends through the plate 180 and is seated in cam rod journal 187 in lower housing 22. The cam rod 184 also extends in the axial direction through the upper housing 64 (see FIG. 13) and is connected to an operator controlled actuating lever (not shown) which allows the operator to rotate the cam rod 184 to cause disengagement of the hydrostatic unit 21. Upon a 90° rotation of cam rod 184, the cam portion 186 engages the plate 180 so as to cause radial movement of the plate 180 and fingers 115 and 117 towards pintle 72 to unseat the ball valves 110 and 111. Counterrotation of the cam rod 184 by 90° thus rotates the cam portion 186 to urge plate 180 and fingers 115 and 117 away from ball valves 110 and 111 whereupon fluid pressure within pintle passageways 106 and 107 force the ball valves 110 and 111 into a closed position so that the hydrostatic unit 21 may again be operable.

In operation, when the operator of the vehicle in which the hydrostatic transaxle 20 is installed wants to manually push the vehicle, the hydrostatic unit 21 must be disengaged so that motion transmitted through the axles 46 and 47 does not cause the motor 26 to pump fluid to the pump 24 thereby transferring motion back to the input drive shaft 60 and the external energy source such as an internal combustion engine (not shown), as it would be difficult to act against the resistance of the hydrostatic unit 21 and the input shaft 60. Releasing the oil within the pintle passageways 106 and 107 of the pintle 72 fluidly disconnects the motor 26 from the pump 24 as the oil pumped from the motor 26 thereby exits from the discharge ports 115 and 117, into the hydrochamber, rather than into pump 24. The release of oil pressure within pintle 72 is accomplished by unseating the ball valves 110 and 111, being urged closed against threaded plug 112 and 113 defining discharge ports 115 and 117, through rotation of cam rod 184. Upon reseating of ball valves 110 and 111 when fingers 182 and 183 retract, the pump 24 and motor 26 are once again in fluid communication.

Referring to FIG. 2, particulates in the hydrostatic fluid circulating through the hydrostatic transaxle unit are captured by cast-in protrusions or baffles 188 located in the lower transaxle housing 22 which serve as particulate traps, the impinging particulates settling to the bottom of the troughs 190 defined by the protrusions 188. Thus, any particulates that might be suspended in the oil are settled out upon circulation. This keeps the oil within the transaxle 20 relatively free from particulates that would otherwise degrade the performance and damage the various sensitive moving parts of the transaxle 20, and eliminates the need for a filter. In addition, a magnet 192 can be attached to the interior of lower housing 22 to attract and capture large ferrous materials that would not otherwise be captured by protrusions 188.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A hydrostatic transmission comprising:
 a housing including a first part and a second part fastened to said first part, said first and second parts defining an interface therebetween where said first and second parts meet;
 input drive means for transmitting rotational energy to said transmission;
 a conduit disposed within said housing;
 a pump in said housing driven by said input drive means, said pump radially disposed on said conduit and in fluid communication therewith, said pump including a plurality of pump pistons rotatably disposed radially outwardly of said conduit;

said pump including a track ring radially outwardly disposed of said pump pistons, said pump track ring guiding said piston and being eccentrically pivotable about said conduit;

a motor in said housing radially disposed on said conduit and in fluid communication therewith, said motor including a plurality of motor pistons rotatably disposed radially outwardly of said conduit;

a motor track ring radially outwardly disposed of said motor pistons and guiding said pistons, said motor track ring being radially clampingly retained by said housing parts at said interface to maintain said motor track ring fixed relative to said conduit; and output drive means connected to said motor for outputting rotational energy therefrom.

2. The hydrostatic transmission of claim 1, wherein said motor track ring includes radially outwardly extending projections clamped between said housing parts at said interface.

3. The hydrostatic transmission of claim 2, wherein said housing includes cast-in recesses, said projections being retained in said recesses.

4. The hydrostatic transmission of claim 2, wherein said projections extend radially outwardly.

5. The hydrostatic transmission of claim 4, wherein said motor has an axis of rotation defined by said conduit, and said projections are disposed 180° from each other about said axis.

6. The hydrostatic transmission of claim 4, wherein said projections are cast integral with said motor track ring.

7. The hydrostatic transmission of claim 2, wherein said motor has an axis of rotation defined by said conduit, and said projections are disposed 180° from each other about said motor track ring.

8. The hydrostatic transmission of claim 2, wherein said projections are cast integral with said motor track ring.

9. The hydrostatic transmission of claim 1, wherein said motor track ring includes a pair of radially outwardly extending projections.

10. A hydrostatic transmission comprising a two piece housing defining a cavity in which is disposed a conduit, a pump with a pivotable pump track ring and being radially outwardly disposed on said conduit and including a plurality of pump pistons rotatably disposed radially outwardly of said conduit and radially inwardly of said pump track ring, a motor with a fixed motor track ring and being radially outwardly disposed on said conduit and including a plurality of motor pistons rotatably disposed radially outwardly of said conduit and radially inwardly of said motor track ring, said housing comprising two halves fastened together and defining an interface where said halves meet; and means for radially clampingly retaining said motor track ring by said two housing halves at said interface.

11. The hydrostatic transmission of claim 10, wherein said means for clampingly retaining said motor track ring includes outwardly extending lugs.

12. The hydrostatic transmission of claim 11, wherein said lugs extend radially outwardly.

13. The track ring capturing apparatus of claim 12, wherein said motor has an axis of rotation defined by said conduit, and said lugs are disposed 180° from each other about said axis.

14. The track ring capturing apparatus of claim 11, wherein said two piece housing includes cast in recesses for receiving said lugs.

* * * * *